(12) United States Patent
Kwan

(10) Patent No.: US 6,250,493 B1
(45) Date of Patent: Jun. 26, 2001

(54) DETACHABLE HANDLE FOR VESSELS

(75) Inventor: Park Soon Kwan, InChon (KR)

(73) Assignee: Kinetic Group, L.L.C., Davenport, IA (US)

( * ) Notice: Subject to any disclaimer, the term of this patent is extended or adjusted under 35 U.S.C. 154(b) by 0 days.

(21) Appl. No.: 09/489,244

(22) Filed: Jan. 21, 2000

(51) Int. Cl.⁷ ................................................. B65D 25/10
(52) U.S. Cl. ............................................................ 220/759
(58) Field of Search .................................. 220/770, 759, 220/755, 756

(56) References Cited

U.S. PATENT DOCUMENTS

| | | |
|---|---|---|
| 1,268,089 | 6/1918 | Borsee . |
| 1,277,182 * | 8/1918 | Borsse . |
| 1,406,826 * | 2/1922 | Dugger . |
| 3,306,648 | 2/1967 | Serio . |
| 3,648,887 | 3/1972 | Hartley . |
| 4,206,853 | 6/1980 | Iten et al. . |
| 4,577,367 | 3/1986 | Durand . |
| 4,965,907 | 10/1990 | Baumgarten . |
| 5,373,608 | 12/1994 | Welch . |
| 5,509,173 | 4/1996 | LaSaosa . |
| 5,555,604 | 9/1996 | Baumgarten . |
| 5,575,516 | 11/1996 | Baumgarten . |
| 5,704,092 | 1/1998 | Nicollet et al. . |
| 5,887,751 | 3/1999 | Kroscher . |

* cited by examiner

Primary Examiner—Stephen Castellano
(74) Attorney, Agent, or Firm—Shughart Thomson & Kilroy P.C.

(57) ABSTRACT

A detachable handle assembly for a vessel includes a slotted mounting plate connected to the vessel and a handle grip with a latching assembly connected at one end. The latching assembly releasably engages the slotted mounting plate to connect the handle grip to the vessel. The latching assembly includes a base plate and a cover with an engagement tip formed at a forward end thereof and a spring biased cam latch slidably mounted in spaced relation below a lower surface of the base plate. The engagement tip includes a leg extending below the base plate of the latching assembly and a foot extending forward from the leg. The latching assembly is connected to the mounting plate by holding the handle grip at an angle relative to the mounting plate and inserting the engagement tip foot into a slot in the mounting plate. The handle grip is then pivoted downward until the cam latch engages a distal end of the mounting plate, causing the spring biased cam latch to move rearward around the distal end of the mounting plate and then back forward beneath the mounting plate, securing the mounting plate between the cam latch and the base plate of the latching assembly.

14 Claims, 4 Drawing Sheets

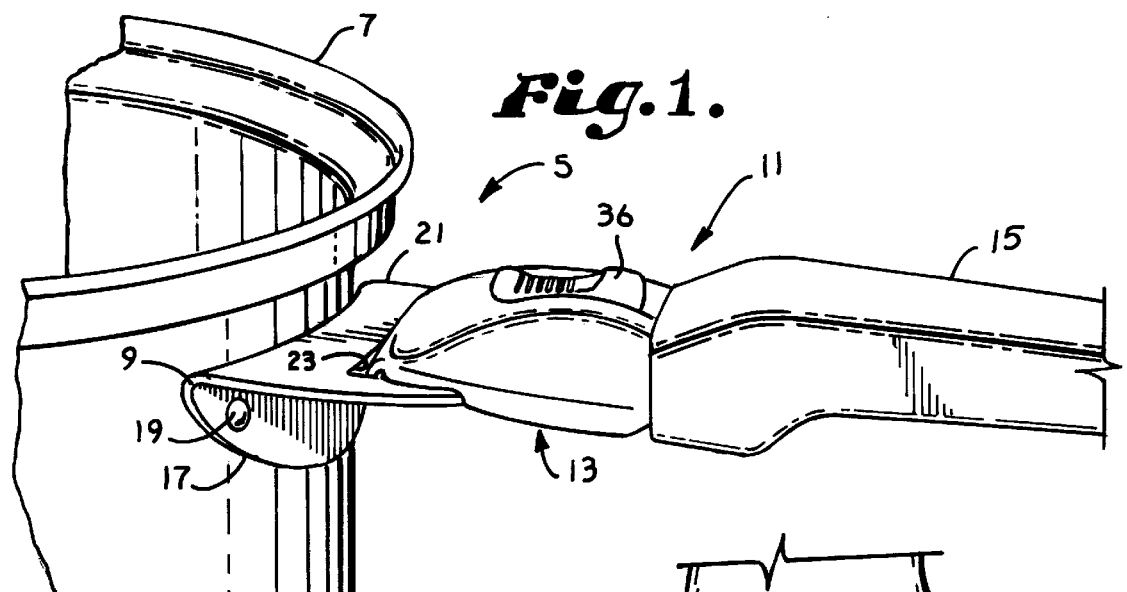
*Fig. 1.*
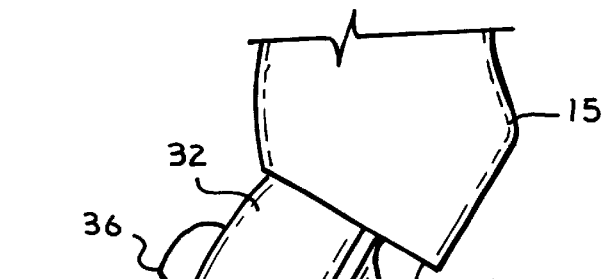
*Fig. 2.*
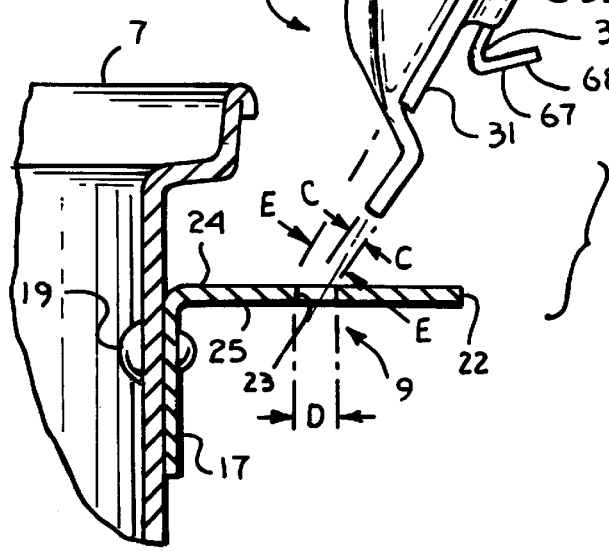

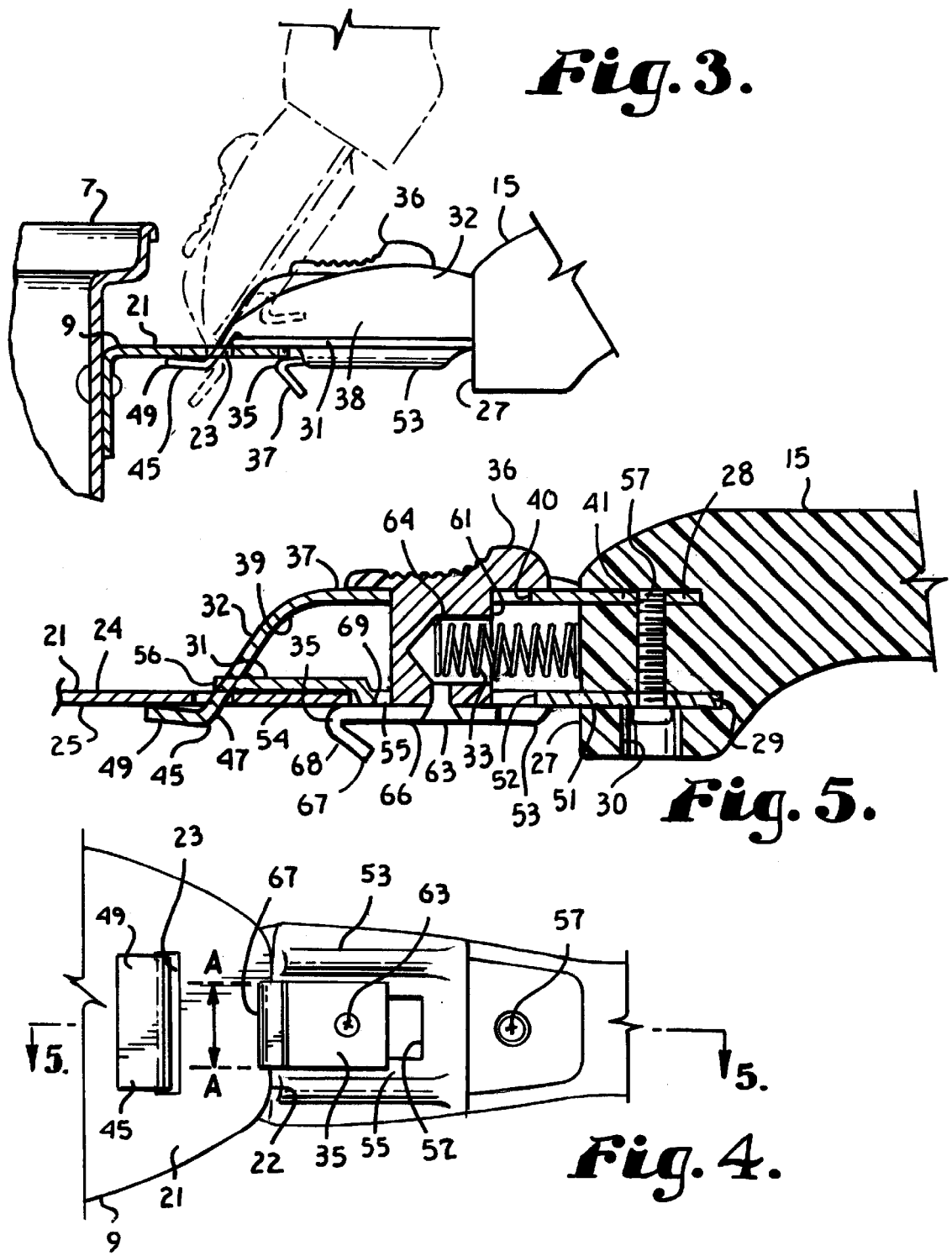

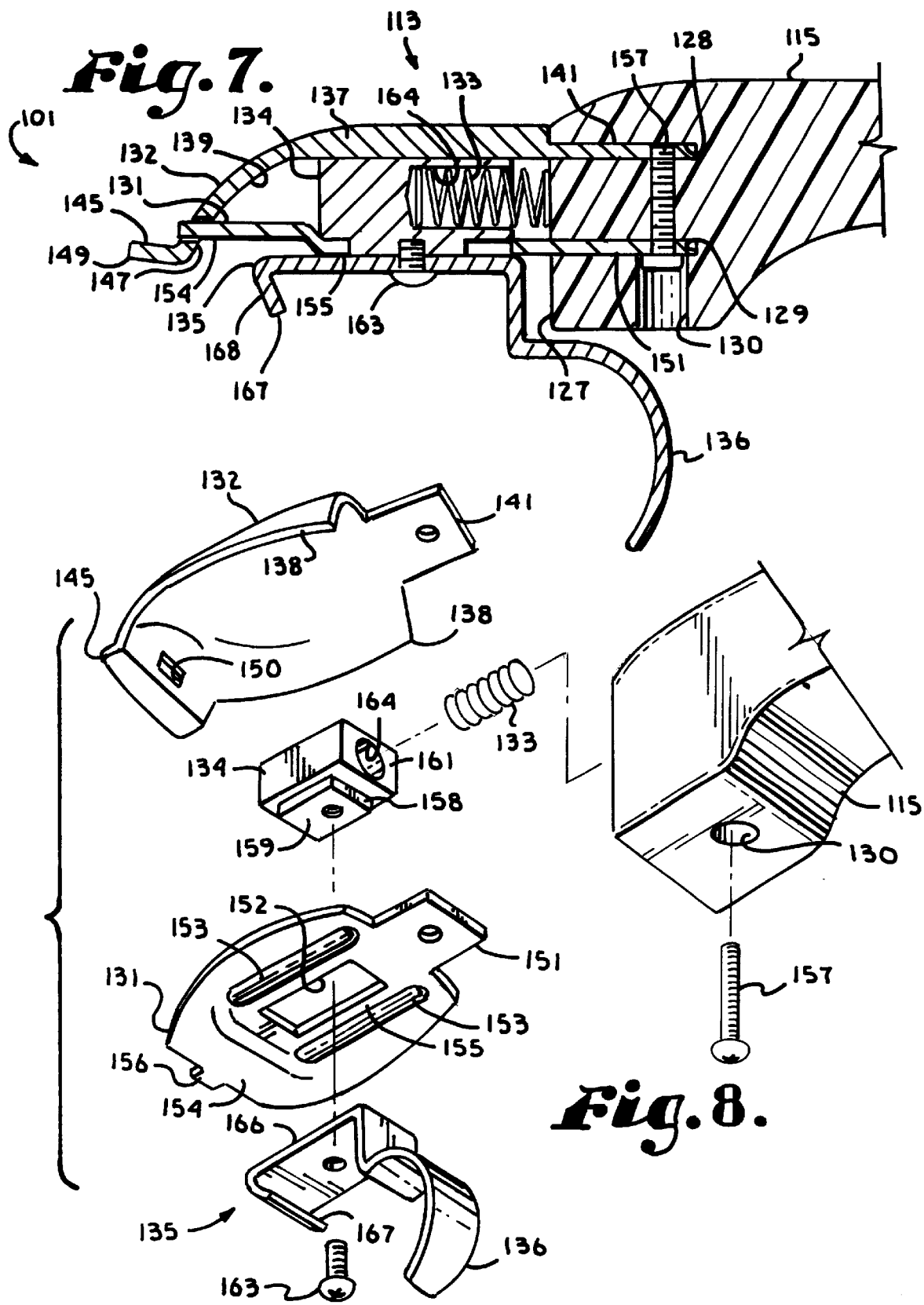

DETACHABLE HANDLE FOR VESSELS

FIELD OF INVENTION

This invention is related to detachable handles for pots, pans, and other vessels or utensils.

BACKGROUND OF INVENTION

Vessels with detachable handles are advantageous for a variety of reasons. Detachable handles allow users to use one handle on several vessels, are easy and efficient to store, eliminate wasted storage space by making it unnecessary to provide space to accommodate the projection of the handle, and allow for easier stacking of pots and pans. The detachable handles themselves are, of course, easy and convenient to store.

A variety of vessels with detachable handles are shown in the prior art. Most detachable handles have rather complicated attachment mechanisms, require similarly complicated matching mounts on the utensils, and are difficult and expensive to make. Many detachable handles require mechanical manipulation of levers or tabs and/or rather precise engagement or manipulation to assure a tight, locked engagement with the utensil. Many of the attachment means also block the user's view of the locking mechanism so that one cannot see if the proper engagement or lock has been achieved. Still other detachable handles are difficult to detach or remove from the utensil, making their use less appealing and, as a practical matter, making it difficult, if not impossible, to switch handles on utensils while they contain and/or are being used to cook food. Most also do not provide positive feedback, such as a sound or other visual signal, that the handle is securely locked in place. Many such attachment mechanisms also allow some movement or "play" in the handle once it is attached, making the attachment somewhat unstable or loose when attached to the utensil.

There is a need for utensils with detachable handles that (a) are simple in structure and relatively easy and inexpensive to make; (b) easily engage the utensil and quickly and automatically lock in place without manipulation of levers or tabs; (c) do not require precise engagement or manipulation in order to achieve a secure engagement or lock with the utensil; (d) allow the user to see or visualize whether the a proper engagement or lock has been achieved when the handle is attached to the utensil; (e) provide positive visual or auditory confirmation or feedback when the handle is engaged and locked in place; and (f) eliminate or substantially reduce the movement or "play" of the handle when it is attached and locked in place.

SUMMARY OF INVENTION

In the present invention, a handle assembly having a latching assembly and handle grip is detachably engaged and locked onto a mounting plate on a vessel. The mounting plate has an upper and lower surface and a slot extending therethrough to facilitate engagement of the latching assembly to the mounting plate. The latching assembly comprises a base plate, a mounting plate engaging tip, a cam latch and a spring. The mounting plate engaging tip includes a leg, extending transverse to the base plate at an outer end thereof and a foot extending forward of the leg in parallel spaced relation to the base plate. The cam latch is slidably mounted relative to the base plate rearward of the mounting plate engaging tip. The spring biases the cam latch toward the mounting plate engaging tip.

The handle latch assembly is securable to the mounting plate by advancing the mounting plate engaging tip foot through the slot in the mounting plate at an angle and rotating the handle to advance the foot into abutment with bottom surface of the mounting plate. Rotation of the handle advances a cam sufrace of the cam latch into engagement with the distal end of the mounting plate driving the latch rearward against the biasing force of the spring until the front end of the latch passes across the distal end of the mounting plate. The spring then biases the cam latch forward below and into abutment with the lower surface of the mounting plate positioning the distal end of the mounting plate between the cam latch and the base plate. Engagement of the mounting plate by the mounting plate engaging tip and the cam latch secures the handle assembly to the mounting plate and the vessel.

The handle assembly is released from the mounting plate by drawing the cam latch rearward against the biasing force of the spring until the cam surface is advanced past the distal end of the mounting plate. The handle is then rotated to rotate the cam latch past the distal end of the mounting plate and to rotate foot of the mounting plate engaging tip out of engagement with the lower surface of the mounting plate. The handle is then pulled away from the mounting plate to withdraw the mounting plate engaging tip from the slot in the mounting plate.

A button connected to the cam latch, by a post, is utilized to draw the cam latch rearward against the biasing force of the spring. The spring is positioned in a cavity formed between a cover plate and base plate of the latching assembly. The post extends through aligned slots in the cover plate and the base plate and through the cavity with the button extending above the cover plate and the cam latch extending below the base plate. One end of the spring abuts against an end of the handle grip and the opposite end of the spring abuts against the post to which the cam latch is secured. The spring thereby biases the cam latch forward away from the end of the handle grip.

The invention provides a vessel with a detachable handle that (a) is simple in structure and relatively easy and inexpensive to make, because it has only a few parts that are easy to fabricate; (b) is easy to engage with the vessel and quickly and automatically locks in place via the latching mechanism, without the need to without manipulate of levers or tabs; (c) does not require precise engagement or manipulation in order to achieve a secure engagement or lock with the vessel, because the user need only insert the foot of the mounting plate engaging tip into the slot in the mounting plate on the vessel and allow the handle to rotate downward; (d) allows the user to see or visualize whether the a proper engagement or lock has been achieved when the handle is attached to the vessel; (e) provides positive visual feedback of engagement and locking as noted immediately above, and also provides auditory confirmation of engagement and locking when the latch snaps forward under the mounting plate; and (f) eliminates or substantially reduces the movement or "play" of the handle when it is attached and locked in place, as is more fully described below. The invention has other advantages as will be noted from the drawings and detailed description, and the statement above is not intended to be limiting.

BRIEF DESCRIPTION OF THE DRAWINGS

FIG. 1 is a fragmentary perspective view of the detachable handle mounting assembly of the present invention including a mounting plate connected to a vessel and a handle grip connected to the mounting plate by a latching assembly.

FIG. 2 is an enlarged and fragmentary front elevational view of the detatchable handle mounting assembly showing the vessel and mounting plate in cross-section and the handle grip and latching assembly separated from and positioned for advancement into engagement with the mounting plate.

FIG. 3 is a reduced and fragmentary front elevational view similar to FIG. 2 showing the vessel and mounting plate in cross-section and the handle grip and latching assembly connected to the mounting plate.

FIG. 4 is a fragmentary bottom plan view showing the handle grip and latching assembly connected to the mounting plate.

FIG. 5 is an enlarged and fragmentary cross-sectional view taken along line 4—4 of FIG. 5.

FIG. 7 is a cross-sectional view of an alternative embodiment of the latching assembly and handle grip similar to FIG. 5.

FIG. 8 is an exploded, fragmentary perspective view of the alternative embodiment of the latching assembly and handle grip.

DETAILED DESCRIPTION OF PREFERRED EMBODIMENT

Figure 6:
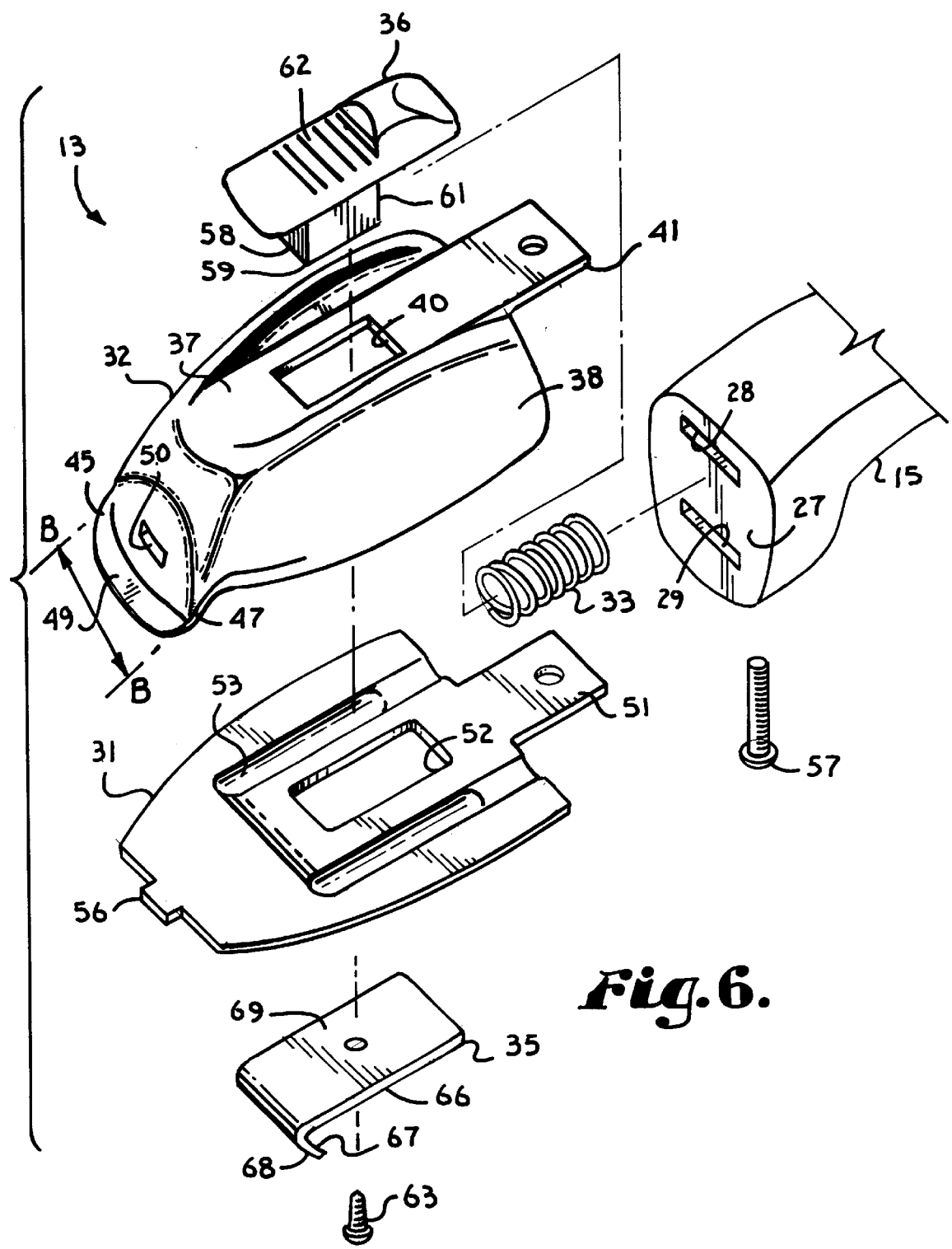
FIG. 6 is an exploded, fragmentary, perspective view of the latching assembly and handle grip.

The following convention is used in this detailed description. The words "upper," "top," "above," and words of like import refer to that direction in the properly oriented, upright drawings. The words "down," bottom," "lower," "below," and words of like import refer to that direction in the properly oriented, upright drawings. The words "front," "forward," and words of like import refer to the left hand direction in the properly oriented, upright drawings, and the words "rear," "rearward," and "back" refer to the right hand direction in the properly oriented, upright drawings.

Referring to the drawings in more detail, the reference numeral 5 refers to a detachable handle mount assembly of the present invention shown secured to a vessel 7. The vessel 7 may be a pot, pan, or other common container or utensil used to hold or cook food or other substances. The handle mount assembly 5 comprises a mount 9 attached to the vessel 7 and a handle assembly 11. The handle assembly 11 comprises a latching assembly 13 and a handle grip 15.

The mount 9 is preferably made of metal, although it could be made of plastic or some other heat resistant material. As shown in FIGS. 1, 2, and 3, the mount 9 has a downwardly projecting flange or lip 17 for use in securing the mount 9 to a wall of the vessel 7. The mount flange 17 is shaped to fit on the side of the vessel 7. The mount 9 may be secured to the wall of the vessel 7 by rivets 19, welds, or any other type of secure attachment. The mount 9 also includes a mounting plate or projection 21, which, in the preferred embodiment, is substantially flat; however, other non-flat shapes might be used. As best shown in FIG. 2, the mounting plate 21 terminates at a distal end 22. A slot 23 extends through the mounting plate 21 from an upper surface 24 to a bottom surface 25 thereof.

The handle grip 15 may be made of any suitable material which is relatively rigid, durable, easy to grip, and resistant to the conduction of heat. As best shown in FIG. 5 and 6, the handle grip 15 has a generally flat, vertically extending face 27 formed at a front end thereof. A pair of internal slots 28 and 29 extend into the handle grip 15 from the face 27, generally horizontally relative to the face 27. A screw hole 30 is formed in the handle grip 15 and extends transversely through the internal slots 28 and 29. The internal slots 28 and 29 are adapted to receive and secure the latching assembly 13 as further described below.

As best shown in FIG. 6, the latching assembly 13 comprises base plate 31, cover 32 spring 33, cam latch 35, and button or lever 36. The latching assembly 13 is preferably made of metal, but may be made of any suitable material which is rigid and durable. The cover 32 includes an upper surface 37 and downwardly extending sidewalls 38 whose lower peripheral edges abut outer edges of the base plate 31. An interior compartment, chamber or cavity 39 is formed between the cover 32 and base plate 31. An upper rectangular slot 40 extends through the upper surface 37 of the cover 32 and opens into the cavity 39.

A cover tang or projection 41 extends rearward from the cover 32 and a mounting plate engaging tip 45 is formed on the front of the cover 32. As best seen in FIG. 5, the engaging tip 45 includes a leg 47 and a foot 49. The leg 47 extends in front of and downward from the base plate 31. The foot 49 is connected to the leg 47 at an outer end thereof and extends forward from or away from the base plate 31 in parallel spaced relation below the base plate 31. As discussed in more detail below, the mounting plate engaging tip 45 is sized to fit within the slot 23 in the mounting projection 21 of the mount 9. A tab opening 50 extends through a front face of the cover 32.

The base plate 31 includes a base plate tang or projection 51 extending rearwardly therefrom, a rectangular slot 52, downward extending and laterally spaced ribs 53 (See FIG. 6), a downwardly facing abutment surface 54 and a downwardly displaced latch slide surface 55. As discussed in more detail below and as seen in FIG. 5, the latch 35 is connected to the latching assembly 13 below and in abutting relationship with the latch slide surface 55 such that the latch 35 may slide forward and rearward relative to the latch slide surface 55. The latch slide surface 55 is spaced rearward of and downward from the downwardly facing abutment surface 54 in parallel spaced relation thereto. As shown in FIG. 6, a front tab 56 sized to fit within the tab opening 50 of the cover 32 is formed on a front end of the base plate 31. The base plate 31 abuts the bottom peripheral edges of the cover sidewalls 38 and the rectangular slot 52 of the base plate 31 is aligned with and spaced directly below the rectangular slot 40 in the cover 32. The base plate tang 51 is aligned with and spaced directly below the cover tang 41 so that the tangs 41 and 51 may be inserted into the slots 28 and 29, respectively, of the handle grip 15 and secured in place by a screw 57 threaded into screw hole 30.

As shown in FIG. 6, the lever 36 of latching assembly 13 includes a downwardly extending post 58 having a bottom end 59 and a rear face 61. An upper surface 62 of the lever is shaped to facilitate gripping and may generally be referred to as a gripping surface 62. The cam latch 35 is mounted to the bottom end 59 of the post 58 by a screw 63; however, the attachment could be accomplished by a weld or other well know means of secure attachment. The rectangular slot 52 of the base plate 31 is aligned with and spaced directly below the rectangular slot 40 in the cover 32. The downwardly extending post 58 extends through the slot 40 in the cover 32, the interior compartment 39 and the slot 52 in the base plate 31. The post 58 is sized such that the bottom end 59 of the post 58 extends generally flush with the lower surface of the latch slide plate 55 of the base plate 31 such that the cam latch 35 is positioned in generally abutting or closely spaced relationship with the latch slide surface 55, and a front end of the cam latch 35 is spaced below the downwardly facing abutment surface 54 of the base plate 31 a distance slightly greater than the thickness of the mounting plate 21. The post 58 is smaller than the aligned slots 40 and 52 in the cover 32 and base plate 31 respectively so that the post 58 can move forward and backward within the aligned slots 40 and 52.

In a preferred embodiment, a bore 64 extends into the post 58 from the rear face 61 thereof. As shown in FIG. 5, the bore 64 is sized to receive a front end of the spring 33. The spring 33 is compressed and positioned within the interior compartment 39 in the latching assembly 13 such that the front end of the spring 33 extends into the bore 62 and abuts against post 58, and a rear end of the spring 33 abuts the face 27 of the handle grip 15 such that the post 58 is biased forward within the interior compartment 39 and the slots 40 and 52 of the latching assembly 13. The bore 64 provides a means for conveniently positioning the spring 33 in the post 58 so as to permit the spring 33 to be maintained in correct horizontal alignment with the face 27 of the handle grip 15 and to permit the spring 33 to be more easily installed in the latching assembly 13. It is foreseen that the front end of the spring 33 could simply abut against the rear face 61 of the post 58 without a bore therein.

As shown in FIG. 6, the cam latch 35 includes latch plate 66 and a cam plate or lip 67 which slopes rearward from a front end of the latch plate 66. The outer surface of the cam plate 67 may be generally referred to as a cam surface 68. An upper surface 69 of the latch plate 66 may be generally referred to as an upwardly facing abutment surface. The latch plate 66 is positioned between the ribs 53 of the base plate 31 for easy alignment of the cam latch 35 during assembly and in order to reduce side movement of the cam latch 35 after assembly. As generally described above, a portion of the upper surface 69 of the latch plate 66 is generally positioned in abutting relation to the latch slide surface 55 of the base plate 31 such that the latch plate 66 is slidable across the latch slide surface 55. A portion of the latch plate upper surface 69 extends forward of the latch slide surface 55 in parallel spaced relation with the downwardly facing abutment surface 54 of the base plate 31. The latch plate 66, as shown in FIG. 5, is level with the foot 49 of the mounting plate engaging tip 45. Because the cam latch 35 is connected to the downwardly extending post 58 of the lever 36, the cam latch 35 is also urged or biased in a forward position by the spring 33 acting against the post 58.

In order to permit easy engagement and locking of the latching assembly 13 with the mount 9, and, further, in order to eliminate or reduce the movement or "play" between the handle assembly 11 and the mount 9, there are certain relative dimensions and relative placements which should be maintained. It is recommended that the length or longest dimension of the slot 23 in the mounting plate 21 (dimension A—A in FIG. 5) not exceed the width or longest dimension of the foot 49 of the mounting plate engagement tip 45 (dimension B—B in FIG. 6) by more than 0.3 millimeters with a tolerance of plus or minus 0.13 millimeters for each dimension or plus or minus 0.26 for both dimensions. This equates to a plus or minus tolerance on each dimension of 0.5% (0.005). Further, it is recommended that the width of the slot 23 in the mounting plate 21 (dimension D—D in FIG. 2) not exceed the thickness of the foot 49 of the mounting plate engagement tip 45 (dimension C—C in FIG. 2) by more than 1.5 millimeters with the same tolerance of plus or minus 0.5% on each set of dimensions. Still further, it is recommended that the difference between the thickness of the foot 49 (dimension C—C in FIG. 2) and the distance to which the foot 49 extends down below the bottom peripheral edges of sidewalls 38 of the cover 32 (dimension E—E in FIG. 2) not exceed 4.5 millimeters, again with a tolerance of plus or minus 0.5% (0.005) on each dimension. Finally, the bottom end 59 of the post 58 should not extend down below the slot 52 in the base plate 31 by more than 0.13 millimeters, again with a plus or minus tolerance or 0.5% (0.005).

The use and application of the dimensional relationships described above will substantially reduce or eliminate any play, looseness, or movement of the handle assembly 11 when it is connected and locked to mount 9.

In use and operation, the handle assembly 11 is first positioned at an angle above the mount 9 as shown in FIG. 2. The handle assembly 11 is then moved downward and the foot 49 of the mounting plate engaging tip 45 is inserted into the slot 23 in the mounting plate 21 of the mount 9 as shown in phantom lines in FIG. 3. The handle assembly 11 is then permitted to rotate downward toward a horizontal position parallel to the mounting plate 21 of the mount 9 as shown in solid lines in FIG. 3. It will be noted here that the forward and downward orientation of the foot 49, as shown in FIG. 2, permits the foot 49 to be inserted downward into the slot 23 in the mount 9.

As the handle assembly 11 is allowed to rotate downward, the foot 49 is pivoted into abutment with the bottom surface 25 of the mounting plate 21 forward of the slot 23 and the leg 47 is advanced into the slot 23 of the mounting plate 21. The length of the mounting plate 21 from the slot 23 to the distal end 22 thereof is sized such that as the handle assembly 11 is pivoted toward a horizontal alignment, the cam surface 68 engages the mounting plate distal end 22. As the handle assembly 11 is further pivoted to the horizontal alignment, the downward and rearward slope of the cam surface 68 causes the cam latch 35 to advance rearward against the biasing force of the spring 33 and away from the distal end 22 of the mounting plate 21 until the front end of the cam latch 35 advances across and past the distal end 22 of the mounting plate 21. The spring 33 then biases the cam latch 35 forward such that the upper surface 69 of the latch plate 66 advances across and beneath the bottom surface 25 of the mounting plate 21. The mounting plate 21 is thereby positioned between the upwardly facing abutment surface 69 of the latch plate 66 and the downwardly facing abutment surface 54 of the base plate 31, locking the handle assembly 11 in place and preventing the handle assembly 11 from rotating upward and preventing the foot 49 of the latching assembly 13 from being pivoted for removal of the foot 49 from the slot 23 in the mounting plate 21 of the mount 9.

Abutment of a rear surface of the leg 47 of the mounting plate engaging tip 45 against a rear inner edge of the slot 23 in the mounting plate 21 prevents the handle from being pulled rearward off of the mounting plate 21. The handle assembly 11 is further locked in place, because the foot 49 extends below and in contact with a bottom surface 25 of the mounting plate 21, preventing it from moving or being removed.

Further, as the handle assembly 11 settles into its horizontal position, advancement of the cam surface 68 of the cam latch 35 past the distal end of 22 of the mounting plate 21 causes an audible sound or click to issue, thus providing audible feedback to the user of the engagement and locking of the handle assembly 11 onto the mounting plate 21 of the mount 9. The engagement and locking of the handle assembly 11 is also visible to the user, who can see the engagement of the latch plate 35 below the base plate 31, thus providing additional feedback to the user of the engagement and locking of the handle assembly 11 onto the mounting plate 21 of the mount 9.

The handle assembly 11 is removed from the mount 9 by moving the lever 36 (by grasping the gripping surface 62 with the thumb) backward against the bias of the spring 33 and then lifting or rotating the handle assembly 11 upward. As the lever 36 is moved backward, the post 58 of the lever 36 compresses the spring 33, and the latch plate 35 (which is attached to the bottom end 59 of the post 58) slides backward until the cam surface 68 of the cam latch 35 is behind the distal end 22 of the mounting plate 21. In this position, the upper surface 69 of the latch plate 35 is no longer in contact with the downwardly facing abutment surface 54 of the base plate 31, allowing the handle assembly 11 to be rotated upward until the tip foot 49 of the latching assembly 13 may be lifted out of and removed from the slot 23 in the mounting plate 21, thus detaching and disengaging the handle assembly 11 from the mount 9.

ALTERNATIVE EMBODIMENT

An alternative embodiment of a detachable handle assembly 101 is shown in FIGS. 7 and 8. The handle assembly 101 comprises a latching assembly 113 and a handle grip 115. Handle grip 115 is of identical construction as handle grip 15 and includes a generally flat, vertically extending face 127 formed at a front end thereof. A pair of internal slots 128 and 129 extend into the handle grip 115 from the face 127, generally horizontally relative to the face 127. A screw hole 130 is formed in the handle grip 115 and extends transversely through the internal slots 128 and 129. The internal slots 128 and 129 are adapted to receive and secure the latching assembly 113 as further described below.

The latching assembly 113 comprises a base plate 131, cover 132, spring 133, post 134, cam latch 135 and finger grip 136. The cover 132 includes an upper wall 137 and downwardly extending sidewalls 138 whose lower peripheral edges abut outer edges of the base plate 131. An interior compartment, chamber or cavity 139 is formed between the cover 132 and the base plate 131. A cover tang or projection 141 extends rearward from the cover 132 and a mounting plate engaging tip 145 is formed on the front of the cover 132. The engaging tip 145 includes a leg 147 and a foot 149. The leg 147 extends in front of and downward from the base plate 132. The mounting plate engaging tip 145 is sized to fit within the slot 23 in the mounting projection 21 of the mount 9. A tab opening 150 extends through a front face of the cover 132.

The base plate 131 includes a base plate tang or projection 151 extending rearwardly therefrom, a rectangular slot 152, downward extending and laterally spaced ribs 153, a downwardly facing abutment surface 154 and a downwardly displaced latch slide surface 155. The latch 135 is connected to the latching assembly 113 below and in abutting relationship with the latch slide surface 155 such that the latch 135 may slide forward and rearward relative to the latch slide surface 155. The latch slide surface 155 is spaced rearward of and downward from the downwardly facing abutment surface 154 in parallel spaced relation thereto.

A front tab 156 sized to fit within the tab opening 150 of the cover 132 is formed on a front end of the base plate 131. The base plate 131 abuts the bottom peripheral edges of the cover sidewalls 138. The base plate tang 151 is aligned with and spaced directly below the cover tang 141 so that the tangs 141 and 151 may be inserted into the slots 128 and 129, respectively, of the handle grip 115 and secured in place by a screw 157 threaded into the screw hole 130.

The post 134 includes a lower portion 158 of reduced cross-section adapted to fit within the rectangular slot 152 of the base plate 131. The lower portion 158 of post 134 is slightly narrower than the rectangular slot 152 and considerably shorter than the slot 152. The post also includes a bottom end 159 and a rear face 161. The cam latch 135 is mounted to the bottom end 159 of the post 134 by a screw 163. The lower portion 158 of the post 134 is sized such that the bottom end 159 of the post 134 extends generally flush with the lower surface of the latch slide plate 155 of the base plate 131 such that the cam latch 135 is positioned in generally abutting or closely spaced relationship with the latch slide surface 155. A front end of the cam latch 135 is spaced below the downwardly facing abutment surface 154 of the base plate 131 a distance slightly greater than the thickness of the mounting plate 121. The lower portion 158 of post 134 is shorter than the rectangular slot 152 so that the post 134 can move forward and backward within the slot 152.

A bore 164 extends into the post 158 from the rear face 161 thereof. The bore 164 is sized to receive a front end of the spring 133. A front end of the spring abuts against the post 134 and a rear end of the spring 133 abuts the face 127 of the handle grip 115 such that the post 134 is biased forward within the interior compartment 139 and in the slot 152.

The cam latch 135 includes latch plate 166 and a cam plate or lip 167 which slopes rearward from a front end of the latch plate 166. The outer surface of the cam plate 167 may be referred to as a cam surface 168. An upper surface 169 of the latch plate 166 may be referred to as an upwardly facing abutment surface. The latch plate 166 is positioned between the ribs 153 of the base plate 131. The cam latch 135 is secured to the post in a manner similar to the cam latch 35 and generally functions in a manner similar to the latch 35 except that the finger grip 136 is utilized for retracting the cam latch 135 as opposed to the lever 36 for cam latch 35.

The finger grip or trigger 136 is formed on and depends from the latch plate 166 at an end opposite the cam plate 167. The finger grip 136 is integrally formed on the latch plate 166. The finger grip 136 is shaped to facilitate grasping with a finger by a user to draw the cam latch 135 rearward against the biasing force of the spring 133 acting on the post 134 to permit removal of the handle assembly 101 from the mount 9 in a manner similar to that for removing handle assembly 11 from mount 9. It is foreseen that the shape of the finger grip or trigger 136 could be varied from that shown and that the finger grip 136 could be secured to the latch plate 166 by various means other than being integrally formed thereon.

It is obvious that other embodiments and modifications of the present invention will occur readily to those of ordinary skill in the art in viewing these teachings. Thus, this invention is to be limited only by the following claims, which include all such other embodiments and modifications when viewed in conjunction with the above specification and accompanying drawings.

I claim:

1. A detachable handle assembly for a utensil comprising:
   a) a mount attached to a utensil, said mount having a slot and a distal end;
   b) a handle having an attached latching assembly, said latching assembly having an engagement tip and a latch with a front cam surface, said latch being linearly moveable along a latch slide axis and biased forward; and
   c) a lever moveably disposed in said latching assembly, and attached to said latch by a post oriented generally transversely to said latch slide axis; wherein d) when said engagement tip is placed in said slot and said front cam surface of said latch is brought downward into contact with said distal end of said mount, said latch moves around said distal end and beneath said mount, engaging said handle to said utensil; and when said lever is moved rearward, said latch moves around said distal end of said mount, and is lifted to disengage said handle assembly from said mount.

2. A detachable handle assembly for a utensil comprising:
a) a mount attached to a utensil, said mount having a slot and a distal end;
b) a handle having an attached latching assembly, said latching assembly having an engagement tip and a latch with a front cam surface, said latch being linearly moveable along a latch slide axis; and
c) a lever moveably disposed in said latching assembly, and attached to said latch by a post oriented generally transversely to said latch slide axis said post being biased forward; wherein
d) said detachable handle assembly is engaged by inserting said engagement tip in said slot and moving said handle downward until said front lip of said latch contacts and moves around said distal end of said mount and forward beneath said mount; and said detachable handle assembly is disengaged by moving said lever rearward until said front cam surface of said latch is rearward of said distal end of said mount and lifting said handle out of said mount.

3. A detachable handle assembly for a vessel comprising:
a) a mounting plate adapted to be secured to a vessel; said mounting plate having a slot extending through first and second opposed surfaces and having a distal end;
b) a handle grip; and
c) a handle latching assembly connected to said handle grip; said handle latching assembly comprising:
  i) a base plate having a first abutment surface;
  ii) a mounting plate engaging tip including a leg extending downward from said base plate at an outer end thereof and a foot extending forward from said leg in generally parallel spaced relation to said base plate;
  iii) a cover connected to said base plate and forming an internal compartment therebetween; said cover having a first lever slot formed therein extending in alignment with a second lever slot formed in said base plate;
  iv) a post extending through said first and second lever slots and through said internal compartment formed between said cover and said base plate;
  v) a lever button secured to a first end of said post extending through said first lever slot;
  vi) a latch secured to a second end of said post extending through said second lever slot so as to be slidably mounted relative to said base plate rearward of said mounting plate engaging tip; said latch including a second abutment surface and a cam surface; said second abutment surface extending in parallel spaced relationship from said first abutment surface of said base plate and said cam surface sloping rearward from a front of said latch and away from said base plate; and
  vii) a spring positioned within said internal compartment and engaging said post to bias said post and said latch forward toward said mounting plate engaging tip; wherein
d) said handle latching assembly is securable to said mounting plate by advancing said mounting plate engaging tip foot through said mounting plate slot at an angle and rotating said handle to advance said foot into abutment with said second opposed surface of said mounting plate and such that rotation of said handle advances said cam surface of said latch into engagement with said distal end of said mounting plate driving said latch rearward against the biasing force of the spring until said front end of said latch passes across the distal end of said mounting plate and said spring biases said latch forward such that said distal end of said mounting plate is positioned between said first and second abutment surfaces of said base plate and said latch respectively.

4. The detachable handle assembly as in claim 3 wherein:
a) said latch is slidably secured between a pair of outwardly extending ribs formed on said base plate.

5. The detachable handle assembly as in claim 3 wherein:
a) said mounting plate engaging tip is formed on a forward end of said cover.

6. A detachable handle assembly for a vessel comprising:
a) a mounting plate adapted to be secured to a vessel; said mounting plate having a slot extending through first and second opposed surfaces and having a distal end;
b) a handle grip; and
c) a handle latching assembly connected to said handle grip; said handle latching assembly comprising:
  i) a base plate having a first abutment surface and a latch slide surface spaced outward from said first abutment surface;
  ii) a mounting plate engaging tip including a leg extending downward from said base plate at an outer end thereof and a foot extending forward from said leg in generally parallel spaced relation to said base plate;
  iii) a latch slidably mounted relative to said base plate rearward of said mounting plate engaging tip; said latch including a second abutment surface and a cam surface; said second abutment surface extending in parallel spaced relationship from said first abutment surface of said base plate; a portion of said latch plate rearward of said cam surface abutting said latch slide surface; and said cam surface sloping rearward from a front of said latch and away from said base plate; and
  iv) a spring biasing said latch toward said mounting plate engaging tip; wherein
d) said handle latching assembly is securable to said mounting plate by advancing said mounting plate engaging tip foot through said mounting plate slot at an angle and rotating said handle to advance said foot into abutment with said second opposed surface of said mounting plate and such that rotation of said handle advances said cam surface of said latch into engagement with said distal end of said mounting plate driving said latch rearward against the biasing force of the spring until said front end of said latch passes across the distal end of said mounting plate and said spring biases said latch forward such that said distal end of said mounting plate is positioned between said first and second abutment surfaces of said base plate and said latch respectively.

7. The detachable handle assembly as in claim 6 further comprising:
a) a finger grip depending from said latch for drawing said latch rearward.

8. The detachable handle assembly as in claim 6 wherein:
a) said latch is slidably secured between a pair of downwardly extending ribs formed on said base plate.

9. A detachable handle assembly for a vessel comprising:
a) a mounting plate adapted to be secured to a vessel; said mounting plate having upper and lower surfaces, a slot extending therethrough and a distal end;
b) a handle grip;
c) a handle latching assembly connected to said handle grip; said handle latching assembly comprising:
   i) a base plate having a downwardly facing abutment surface;
   ii) a mounting plate engaging tip including a leg extending downward from said base plate at an outer end thereof and a foot extending forward from said leg in generally parallel spaced relation to said base plate;
   iii) a cover connected to said base plate and forming an internal compartment therebetween; said cover having a first lever slot formed therein extending in alignment with a second lever slot formed in said base plate;
   iv) a post extending through said first and second lever slots and through said internal compartment formed between said cover and said base plate;
   v) a lever button secured to a first end of said post extending through said first lever slot;
   vi) a latch secured to a second end of said post extending through said second lever slot so as to be slidably mounted relative to said base plate rearward of said mounting plate engaging tip; said latch including an upwardly facing abutment surface and a cam surface; said upwardly facing abutment surface extending in parallel spaced relationship from said downwardly facing abutment surface of said base plate and said cam surface sloping rearward and downward from a front of said latch; and
   vii) a spring positioned within said internal compartment and engaging said post to bias said post and said latch forward toward said mounting plate engaging tip; wherein
d) said handle latching assembly is securable to said mounting plate by advancing said mounting plate engaging tip foot through said mounting plate slot at an angle and rotating said handle to advance said foot into abutment with said lower surface of said mounting plate and such that rotation of said handle advances said cam surface of said latch into engagement with said distal end of said mounting plate driving said latch rearward against the biasing force of the spring until said front end of said latch passes across the distal end of said mounting plate and said spring biases said latch forward such that said distal end of said mounting plate is positioned between said downwardly facing and upwardly facing abutment surfaces of said base plate and said latch respectively.

10. The detachable handle assembly as in claim 9 wherein:
a) said mounting plate engaging tip is formed on a forward end of said cover.

11. A detachable handle assembly for a vessel comprising:
a) a mounting plate adapted to be secured to a vessel; said mounting plate having upper and lower surfaces, a slot extending therethrough and a distal end;
b) a handle grip;
c) a handle latching assembly connected to said handle grip; said handle latching assembly comprising:
   i) a base plate having a downwardly facing abutment surface and a latch slide surface spaced below said downwardly facing abutment surface;
   ii) a mounting plate engaging tip including a leg extending downward from said base plate at an outer end thereof and a foot extending forward from said leg in generally parallel spaced relation to said base plate;
   iii) a latch slidably mounted relative to said base plate rearward of said mounting plate engaging tip; said latch including an upwardly facing abutment surface and a cam surface; said upwardly facing abutment surface extending in parallel spaced relationship from said downwardly facing abutment surface of said base plate; a portion of said latch plate rearward of said cam surface abutting said latch slide surface; and said cam surface sloping rearward and downward from a front of said latch; and
   iv) a spring biasing said latch toward said mounting plate engaging tip; wherein
d) said handle latching assembly is securable to said mounting plate by advancing said mounting plate engaging tip foot through said mounting plate slot at an angle and rotating said handle to advance said foot into abutment with said lower surface of said mounting plate and such that rotation of said handle advances said cam surface of said latch into engagement with said distal end of said mounting plate driving said latch rearward against the biasing force of the spring until said front end of said latch passes across the distal end of said mounting plate and said spring biases said latch forward such that said distal end of said mounting plate is positioned between said downwardly facing and upwardly facing abutment surfaces of said base plate and said latch respectively.

12. The detachable handle assembly as in claim 11 further comprising:
a) a finger grip depending from said latch for drawing said latch rearward.

13. The detachable handle assembly as in claim 11 wherein:
a) said latch is linearly moveable along a latch slide axis; and
b) said latching assembly further comprises a lever moveably disposed in said latching assembly, and attached to said latch by a post oriented generally transversely to said latch slide axis.

14. The detachable handle assembly as in claim 11 wherein:
a) said latching assembly further comprises a cover connected to said base plate and forming an internal compartment therebetween; said cover having a first lever slot formed therein extending in alignment with a second lever slot formed in said base plate;
b) a post extends through said first and second lever slots and through said internal compartment formed between said cover and said base plate; a lever button is secured to a first end of said post extending through said first lever slot and said latch is secured to a second end of said post extending through said second lever slot; and
c) said spring is positioned within said internal compartment and biasingly engages said post to bias said post and said latch forward.

* * * * *